UNITED STATES PATENT OFFICE.

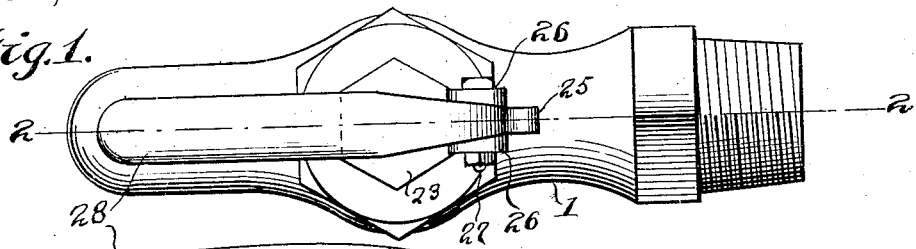
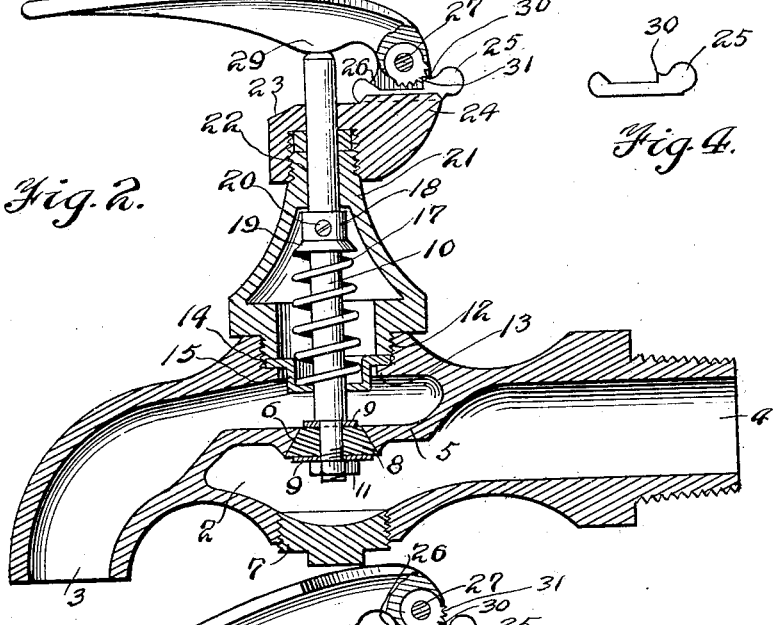
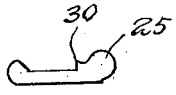
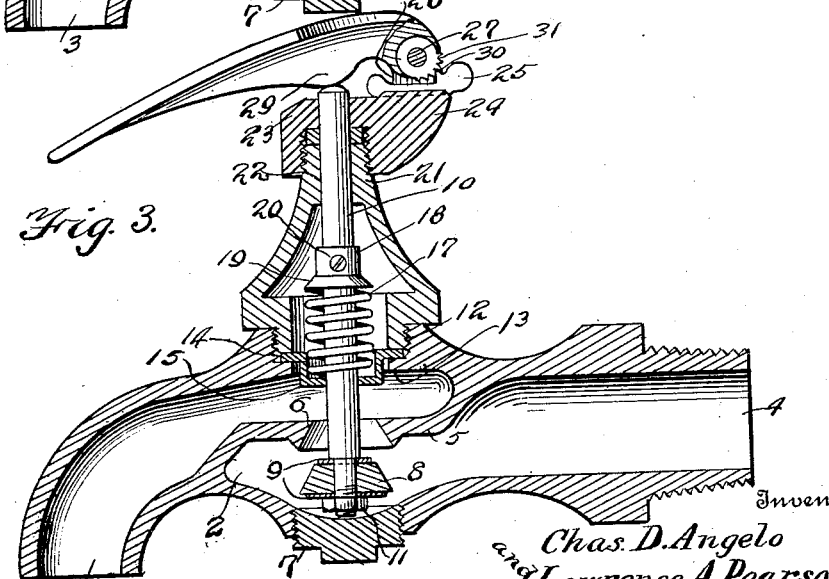

CHARLES DELL ANGELO AND LAWRENCE A. PEARSON, OF DIORITE, MICHIGAN.

FAUCET.

1,190,077. Specification of Letters Patent. Patented July 4, 1916.

Application filed September 15, 1915. Serial No. 50,863.

*To all whom it may concern:*

Be it known that we, CHARLES D. ANGELO, a subject of Italy, and LAWRENCE A. PEARSON, a citizen of the United States, residing at Diorite, in the county of Marquette and State of Michigan, have invented new and useful Improvements in Faucets, of which the following is a specification.

The present invention relates to improvements in faucets, and an object of the invention is to simplify and improve the existing art by providing a faucet wherein the valve actuating parts may be accessible for adjustment or repair without turning off the supply cock and otherwise interfering with the pressure of the fluid in the faucet.

With the above object in view and others which will appear as the nature of the invention is more fully understood, the improvement resides in the construction, combination and arrangement of parts set forth in the following specification and falling within the scope of the appended claim.

In the drawing: Figure 1 is a top plan view of the faucet constructed in accordance with the present invention, Fig. 2 is a longitudinal sectional view approximately on the line 2—2 of Fig. 1, the valve being closed, Fig. 3 is a similar sectional view illustrating the valve locked to an open position, and Fig. 4 is a side elevation of the lock.

The numeral 1 designates a faucet constructed in accordance with the present invention. This faucet may be of any ordinary or desired formation and has its body 2 between its spout or outlet 3 and its nipple or inlet 4 provided with the usual horizontal partition 5 that is centrally formed with an opening providing a valve seat 6. The body 2, directly below the valve seat is formed with a threaded aperture which is normally closed by a screw plug 7, so that access may be obtained to the frusto-conical valve 8 which normally rests upon the seat 6. The valve has its opposite faces provided with disks 9—9 preferably of metal against one of which rests the shouldered end of a valve stem 10, the reduced end of the said stem passing through the washers and valve and being sustained upon the lower and widened face of the valve through the medium of a removable element such as a nut 11. The body 2, above the valve seat is formed with a threaded opening 12, and arranged below the said opening is a shoulder 13. Seated upon the shoulder 13 is the flanged end 14 of a cap member 15, the same having a central opening through which the valve stem 10 projects and the body of the cap provides a seat for one end of the helical spring 17 which surrounds the stem 10. The numeral 18 designates an adjustable collar which is arranged upon the stem 10 and which has its lower portion formed with an outwardly extending angular flange 19, in the nature of a hood, and within this hood is received the other end of the helical spring 17. The collar may be retained in adjusted position upon the valve stem through the medium of an ordinary binding screw 20.

The numeral 21 designates a hollow member which is threadedly connected to the opening 12 and within which is arranged the collar 18 for the helical spring 17, the threaded end of the said member 21 bearing upon the flange 14 of the cap so as to retain the said cap upon the shoulder 13. The member 21 is provided with an opening or bore 22 which affords a bearing or guide-way for the upper portion of the valve stem 10. This end of the member 21 is threaded to receive a threaded cap 23, the said cap being also provided with an opening through which passes the end of the stem 10. The cap is formed with an offset portion 24 terminating in a horizontally straight member, the said member being channeled longitudinally to provide a guide for a slidable lock 25, and the channel within which the lock is arranged is disposed between the opposite sides or projecting ears 26 formed integral with the cap. Pivotally secured as at 27 between the said ears 26 is an actuating lever 28 which has a thickened portion 29 that rests against the end of the stem 10. By swinging the lever 28 the valve 8 will be unseated, as will be readily understood.

The lock has one of its ends formed with a toothed extension 30, and the rounded portion of the lever at its pivot 27 may have its periphery formed with teeth 31 which will be engaged by the teeth 30 of the latch, so that the lever may be locked in a position to retain the valve unseated.

It will be noted that all of the parts are separable and interchangeable, and that the member 21 may be readily disconnected to remove the cap so that access to the interior of the faucet may be obtained while the pressure of the fluid upon the valve 8 will retain the same upon its seat 6, and also that the plug 7 may be removed if desired.

From the above description, taken in connection with the accompanying drawing, the simplicity of the device, as well as the advantages thereof, will, it is thought, be perfectly apparent to those skilled in the art to which such invention appertains without further detailed description.

Having thus described the invention, what we claim is:

A faucet having a spring actuated valve provided with an extending stem, guide members for the stem, means for regulating the tension of the spring, one of said guide members including a cap, said cap having an extension provided with spaced ears, a valve actuating lever pivoted between the ears, said lever having its pivoted end provided with teeth, a slidable lock between the ears, and said lock having teeth adapted to co-act with the teeth of the lever to retain the lever in locked position, as and for the purpose set forth.

In testimony whereof we affix our signatures in presence of witnesses.

CHAS. DELL $\times$ ANGELO.
his mark.

Witness:
   Mrs. CHAS. DELL ANGELO.

LAWRENCE A. PEARSON.

Witnesses:
   FLAKE PEARSON,
   HANNAH SALSON.

Copies of this patent may be obtained for five cents each, by addressing the "Commissioner of Patents, Washington, D. C."